Nov. 20, 1928.

F. BRERO 1,692,245

ELECTRIC MACHINE FOR WELDING METALLIC TUBES OR PIPES

Filed Oct. 25, 1926

Inventor
Francesco Brero
by Henry Ortiz
Atty

Nov. 20, 1928.

F. BRERO 1,692,245

ELECTRIC MACHINE FOR WELDING METALLIC TUBES OR PIPES

Filed Oct. 25, 1926 4 Sheets-Sheet 2

Inventor
Francesco Brero
by Henry Orth
Atty

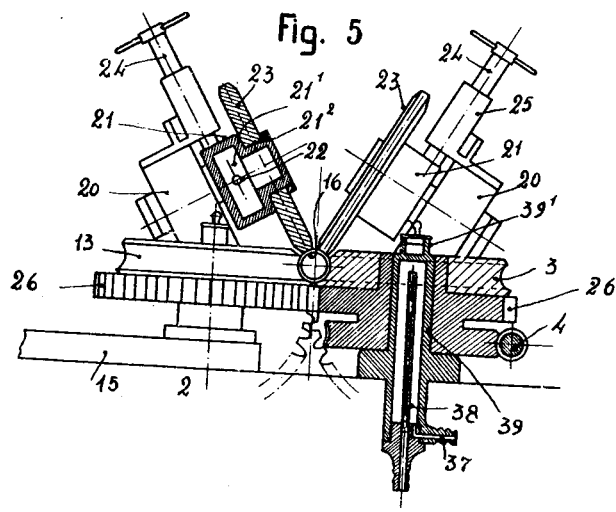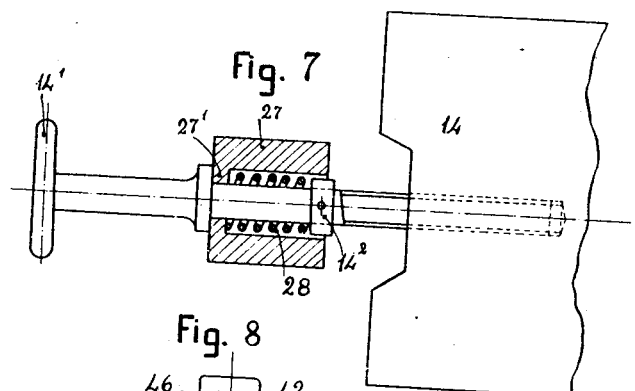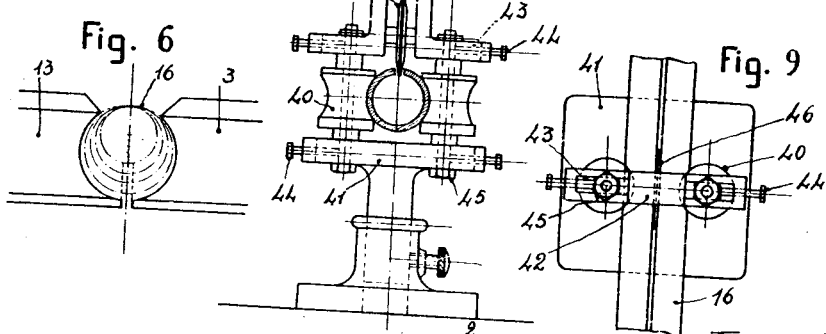

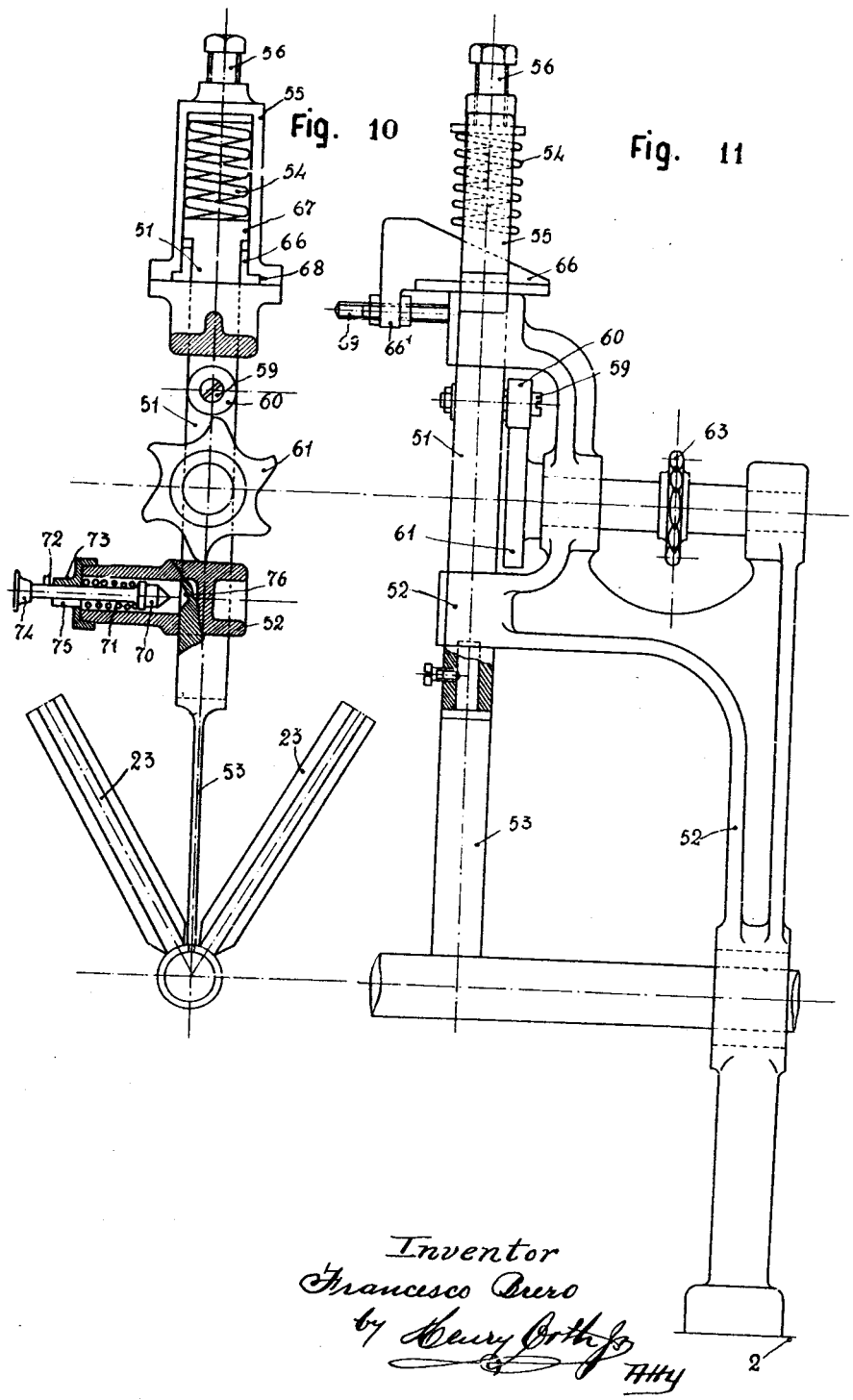

Patented Nov. 20, 1928.

1,692,245

UNITED STATES PATENT OFFICE.

FRANCESCO BRERO, OF TURIN, ITALY.

ELECTRIC MACHINE FOR WELDING METALLIC TUBES OR PIPES.

Application filed October 25, 1926, Serial No. 144,089, and in Italy June 22, 1926.

This invention relates to an electric machine for longitudinally welding tubes or pipes obtained by bringing together the edges of metallic strips which eliminates the disadvantages of the machines of this type employed heretofore. It is known that in such machines where the feed rollers serve generally also as electrodes they are subject to a rapid wear and tear and the work accomplished by the machine is often unsatisfactory owing to the fact that the contact of the rollers with the tube to be welded is not always uniform. Moreover, as the edges to be welded together practically never lie along a generatrix of the tube and form a more or less crooked line with respect to the said generatrix, as the tube is being fed between the welding rollers, the joint comes nearer to one roller than to the other thus displacing the zone of highest temperature which no longer corresponds to the welded seam so that welding is deficient and often a failure.

I have obviated these drawbacks by making the feed rollers wholly independent of the electric parts so that they can be of a rational construction and longer life.

According to my invention the rollers are divided into two pairs, each pair comprising a roller mounted upon a fixed pivot and a roller mounted upon a transversely movable pivot in order to suit the distances of the centres of the couple of rollers to the slight unevennesses and variations in diameter of the tube to be welded whilst exerting the pressure necessary for feeding along the tube.

The rollers mounted on fixed pivots are actuated by means of worms, and the roller coming first in the direction of feed transmits rotation to its respective roller mounted on the movable pivot by means of wheels with involute teeth allowing of the slight displacement of centers, the second roller is not coupled with the corresponding roller mounted on a movable pivot which is pushed towards the former by resilient means and works essentially for guiding the tube, that it holds tight directly after welding, when the elasticity of the material tends to cause the tube to open again.

The roller electrodes serving exclusively for feeding the current are made thin enough in order to bring them nearer together than heretofore and they press the tube near the edges to be welded in exactly a radial direction to the tube itself, thus avoiding friction and wear.

The pressure of the electrodes cannot bend the tube as it is exerted exactly at the point where the tube is supported by the first pair of feed rollers. Moreover, as the electrodes and rollers practically surround the whole circumference of the tube, its heated zone will keep exactly the desired form.

Before the electrodes and near same a device for guiding and adjusting the direction of the tube is provided, comprising a circular blade situated on the plane on which the line of weld shall run and two loosely mounted rollers for supporting the tube. The blade is held between the edges to be welded so as to have these welded always in the middle between the electrodes.

The machine is further characterized by an automatic hammering device acting upon the tube directly after its passage between the electrodes.

It was found that hammering executed at the point and moment when the metal is still at the welding heat ensures a perfect connection of the parts preventing the formation of any porous zones and leaving the metal more compact and resistent as after forging. This hammering prevents moreover the formation of expansions along the welded seam.

The pivots of the rollers and electrodes and their respective arms are water cooled. The electrode-holders are electrically insulated from the metallic mass of the machine in order to prevent this latter from working as return lead.

The accompanying drawing shows by way of example a constructional form of this invention.

Figure 5 is a rear view thereof partly in section on line A—B of Fig. 4.

Figure 6 shows the profile of the feed rollers.

Figure 7 shows the pressure device for the guide rollers.

Figures 8 and 9 are an elevation and a plan view, respectively, of the device for guiding the tube and adjusting the line of weld in the middle between the electrodes.

Figures 10 and 11 show the hammering device.

Figure 1:
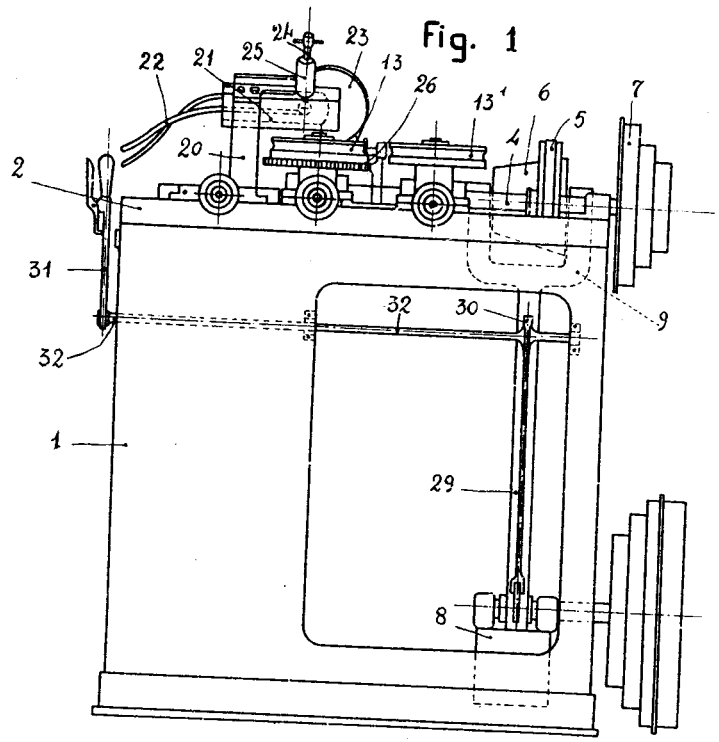
Figures 1, 2, 3 show the machine in side view, plan and front view, respectively.
Figure 2:
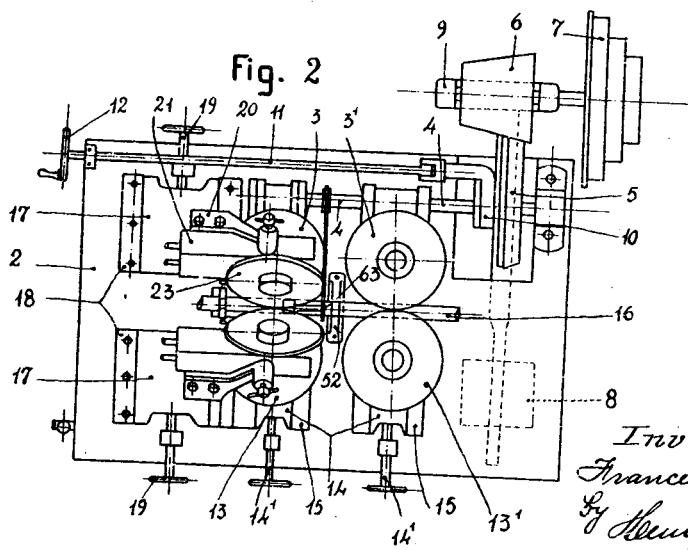
Figure 3:
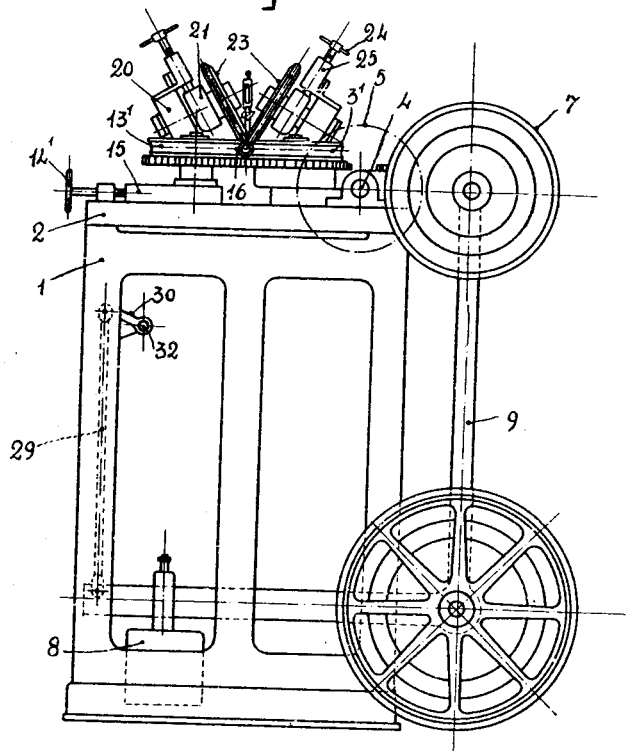

1 denotes a frame on the bed 2 whereof are mounted all the devices; viz two feed rollers 3 and 3′ actuated through worms by a shaft 4 on which is slidably mounted a roller 5 lined with leather, receiving motion from a conical pulley 6 driven by a cone pulley 7 and pressed against the roller 5 under the action of a balance weight 8 acting on the rocking support 9 of the pulley 6.

The roller 5 can be displaced on the shaft in order to vary the transmisison ratio by means of a fork 10 keyed on a rod 11 actuated by means of screw spindle and hand wheel 12.

Facing the rollers 3—3′ are mounted the counter-rollers 13 and 13′ carried on saddles 14 slidable between the guides 15 fixed to the bed 2. The saddles can be displaced by means of screw spindles and hand wheels 14′ serving also for adjusting the pressure on the tube 16 clamped between rollers and counter-rollers.

Roller 13 is operatively connected with roller 3 by means of two toothed wheels 26 (Figs. 1 and 5) having the same diameter and involute teeth in order to allow a slight displacement of the centres as required for adjusting the pressure with which the rollers 3—13 act upon the tube 16. Roller 13′ is perfectly loose. The hand wheel 14² is conveniently constructed as shown in Figure 7, where it is carried by a support 27 enclosing a spring 28 acting between a shoulder 27′ on the said support and a collar 14² of the screw spindle. With this arrangement the roller 13′ acts resiliently upon the tube 16, guiding same faultlessly without hindering its feed even where there are variations in the diameter or other unevennesses of the tube of which roller 13′ highly facilitates the introduction between the rollers.

The four roller pivots consist of hollow pillars 39 provided with a water inlet pipe 37 and upper outlet 38. On the pillar heads is provided an oil tank 39′ from which a small conduit feeds the oil between pivot and roller.

The roller profile is shown diagrammatically in Figure 6, and surrounds almost completely the tube to be welded leaving free only a small zone thereof on the line of weld, upon which the roller electrodes act. The machine is provided with a set of rollers for welding a corresponding set of tubes of different diameter. The rollers of one set are such as to bring the line of weld always at the same height on the bed and therefore on the electrodes and other devices as shown diagrammatically in Figure 6.

The saddles 14 carrying the rollers are generally arranged as near as possible to each other, so that the pairs of rollers 13—3 and 13′—3′ are almost tangential to each other and the welded tube leaving the former, above which are situated the rotating electrodes, promptly reaches the second pair of rollers completing its guide and feed.

For clearness' sake the pairs of rollers are shown on the drawing further apart from each other than they actually are.

Before the saddles 14 are situated two more saddles 17 with guides 18 fixed to the bed 2 and moved by means of screw spindle 70 and hand wheel 19. These saddles carry two inclined pillars 20 supporting the arms 21 holding the electrodes. The arms 21 have a hollow recess 21′ extending within the electrode pivots 21² and in which circulates the cooling water fed and discharged through the insulating tubes 22.

On pivots 21² are mounted the roller electrodes 23 the pressure of which upon the tube edges 16 is adjustable by means of adjusting screws 24 mounted in supports 25 fast with the pillars 20 and acting upon the arms 21.

Figure 4:
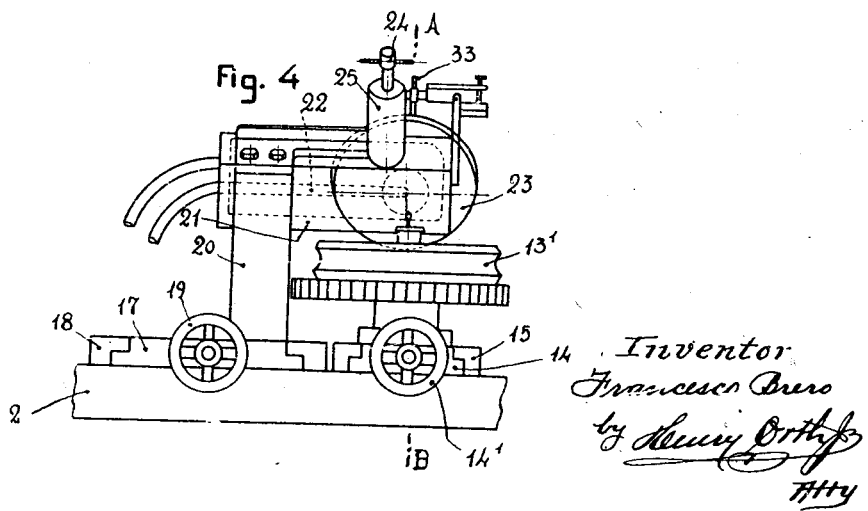
Figure 4 is a detailed side view to an enlarged scale of the tube and current feed devices.

The electrodes are constantly cleaned by brushes 33 formed by a bundle of wires (Fig. 4). Electric current is fed by means of an adjustable transformer disposed within the bed 1 and connected to the pillars 20. The pillars 20 and their saddles are electrically insulated from the bed 2 in order to prevent the metallic parts of the machine from working as return leads.

The feed and stoppage of the tube are obtained by lifting and lowering the balance weight 8 by means of a rod 29 and lever 30 (connected to a hand lever 31 through a spindle 32) thus causing the roller 5 and feed rollers 3, 3′ and 13 to be carried along or released.

The device for adjusting the direction of the line of weld shown in Figures 8 and 9 consists of two grooved rollers 40 guiding the tube and of a circular blade 46 held in engagement between the adjacent edges of the tube to be welded. The rollers 40 are mounted on a base 41 at an adjustable lever on the bed of the machine and their pivots engage in slots 43 on the base 41 and support 42 of the circular blade 46. The screws 44 and nuts 45 serve for adjusting the distance between the rollers 40. As the blade 46 is situated exactly on the plane of symmetry of the electrodes it will keep the line of weld constantly in the middle between the electrodes.

The hammering device consists of a square-section block 51, lodged in a forked support 52 mounted on the machine bed. The block 51 carries below a hammering tool 53 rectangular in section and is pushed downwards by a spring 54 arranged above the block in a stirrup 55 provided with a screw 56 for adjusting the spring pressure. The end of the hammering tool 53 acts upon the edges of the tube 16 directly after the electrodes 23, when the metal is still at the welding temperature. A pivot 59 is fast with the block 51 and carries a roller 60 cooperating with a toothed wheel 61 fast with a sprocket 63 moved by the same shaft 4 as the feed rollers 3—3′. As the wheel 61 turns one tooth, the roller 60 (with block 51 and tool 53) is lifted and compresses the spring 54, whereafter it falls and the tube 16 is hammered exactly in tune with its feed. The intensity of hammering is adjusted by means of the set screw 56 acting upon the spring 54 and the length of the working stroke is regulated by means of a wedge 66 cooperating with two projections 67 on the block 51 for determining the lowermost position of the block. The wedge 66 is guided by two grooves 68 on the stirrup 55 and is provided with a nose 66' in which engages a stud 69 for setting the wedge. Hammering can be interrupted without stopping the machine by locking the block 51 in its uppermost position by means of a brake comprising a stake 70 pushed towards the block by a spring 71 and locked by a pin 72 cooperating with the edge of the guide bushing 73.

By turning the handle 74 of the stake 70, the pin 72 is brought to correspond with a groove 75 on the bushing 73 so that the stake 70 snaps into a seat 76 on the block 51.

What I claim is:

1. In a machine for electrically welding metallic tubes, the combination with feed rollers, roller electrodes, and a device for adjusting the direction of the line of the weld, of a hammering device acting upon the welded seam directly after the electrodes and between the feed rolls and actuated in tune with the tube feed.

2. In a machine for electrically welding metallic tubes, the combination with feed rollers, roller electrodes, and a device for adjusting the direction of the line of the weld, of a hammering device comprising a block movable in a support on the machine frame, a hammering tool at the end of said block and adapted to act upon the tube edges directly after the roller electrodes, an adjustable spring tending to lower said block, an extension on said block, a toothed wheel cooperating with said extension and adapted to lift said block, whereupon the latter is free to descend under the action of the said spring, and means for transmitting the movement from said feed rollers to said toothed wheel.

3. In a machine for electrically welding metallic tubes, the combination with feed rollers, roller electrodes, and a device for adjusting the direction of the line of the weld, of a hammering device comprising a block movable in a support on the machine frame, a hammering tool at the end of said block and adapted to act upon the tube edges directly after the roller electrodes, an adjustable spring means tending to lower said block, an extension on said block, a toothed wheel cooperating with said extension and adapted to lift said block, whereupon the block is free to descend under the action of the said spring, means for transmitting the movement from said feed rollers to said toothed wheel, and means for adjusting the limit of the downward stroke of the hammering tool.

4. In a machine for electrically welding metallic tubes, the combination with feed rollers, roller electrodes, and a device for adjusting the direction of the line of the weld, of a hammering device comprising a block movable in a support on the machine frame, a hammering tool at the end of said block and adapted to act upon the tube edges directly after the roller electrodes, an adjustable spring means tending to lower said block, an extension on said block, a toothed wheel cooperating with said extension and adapted to lift said block, whereupon the block is free to descend under the action of the said spring, means for transmitting the movement from said feed rollers to said toothed wheel, and an adjustable wedge member cooperating with projections on the block for regulating its downward stroke.

5. In a machine for electrically welding metallic tubes, the combination with feed rollers, roller electrodes, and a device for adjusting the direction of the line of the weld, of a hammering device comprising a block movable in a support on the machine frame, a hammering tool at the end of said block and adapted to act upon the tube edges directly after the roller electrodes, an adjustable spring means tending to lower said block, an extension on said block, a toothed wheel cooperating with said extension and adapted to lift said block, whereupon the block is free to descend under the action of the said spring, means for transmitting the movement from said feed rollers to said toothed wheel, and means for locking said block in its uppermost position.

6. In a machine for electrically welding metallic tubes, the combination with feed rollers, roller electrodes, and a device for adjusting the direction of the line of the weld, of a hammering device comprising a block movable in a support on the machine frame, a hammering tool at the end of said block and adapted to act upon the tube edges directly after the roller electrodes, an adjustable spring means tending to lower said block, an extension on said block, a toothed wheel cooperating with said extension and adapted to lift said block, whereupon the block is free to descend under the action of the said spring, means for transmitting the movement from said feed rollers to said toothed wheel, means for adjusting the limit of the downward stroke of the hammering tool, and means for locking said block in its uppermost position.

7. In a machine for electrically welding metallic tubes, the combination with feed rollers, roller electrodes, and a device for adjusting the direction of the line of the weld, of a hammering device comprising a block movable in a support on the machine frame, a hammering tool at the end of said block and adapted to act upon the tube edges directly after the roller electrodes, an adjustable spring means tending to lower said block, an extension on said block, a toothed wheel cooperating with said extension and adapted to lift said block, whereupon the block is free to descend under the action of the said spring, means for transmitting the movement from said feed rollers to said toothed wheel, a seat on the block, a spring pressed stake adapted to cooperate with said seat, a guide bushing for said stake, a pin on the stake cooperating with the edge of said guide bushing to keep said stake in its disengaged position, and a longitudinal groove on the bushing in which said pin may be brought by rotating the stake to cause the latter to snap in said seat for locking said block.

8. In a machine for electrically welding metallic tubes, two feed rollers, a worm-shaft operatively connected with the rollers, a loose counter roller cooperating with one of the feed rollers, a counter roller geared to the other feed roller, means for adjusting the counter rollers, a change speed gear for driving the worm shaft comprising a roller on the shaft, means for moving the roller axially of the latter, conical pulley for frictionally engaging the roller, a weight connected with the pulley for coupling the latter to the roller, means for actuating the weight to uncouple the roller and pulley, radially mounted roller electrodes adapted to engage the tube to be welded, means for adjusting the electrodes, guide-rolls for the tube and a disc for engaging the edges of the tube cooperating with the guide-rolls for maintaining the tube in position.

9. In a machine for electrically welding metallic tubes, two feed rollers, a worm-shaft operatively connected with the rollers, a loose counter roller cooperating with one of the feed rollers, a counter roller geared to the other feed roller, means for adjusting the counter rollers, a change speed gear for driving the worm shaft comprising a roller on the shaft, means for moving the roller axially of the latter, a conical pulley for frictionally engaging the roller, a weight connected with the pulley for coupling the latter to the roller, means for actuating the weight to uncouple the roller and pulley, radially mounted roller electrodes adapted to engage the tube to be welded, means for adjusting the electrodes, guide-rolls for the tube, a disc for engaging the edges of the tube cooperating with the guide rolls for maintaining the tube in position, and mechanism in close proximity to the electrodes and feed rollers for hammering the welded portion of the tube.

10. In a machine for electrically welding metallic tubes, two feed rollers, a worm-shaft operatively connected with the rollers, a loose counter roller cooperating with one of the feed rollers, a counter roller geared to the other feed roller, saddles carrying the counter-rollers, a spindle adjustably connected to each saddle, a support for the spindle having a shoulder therein, a collar on the spindle, a spring on the latter between the shoulder and collar, a roller on the worm shaft, means for moving the roller axially of the shaft, a conical pulley for frictionally engaging the roller, a weight connected with the pulley for coupling the latter to the roller, means for actuating the weight to uncouple the roller and pulley, radially arranged roller electrodes for engaging the edges of the tube to be welded, hollow spindles supporting the electrodes, means for supplying a cooling medium to the spindles, means for radially adjusting the supporting spindles, guide-rolls for the tube, a disc for engaging the edges of the tube, and means for adjusting the guide-rolls and disc.

11. In a machine for electrically welding metallic tubes, two feed rollers, a worm-shaft operatively connected with the rollers, a loose counter roller cooperating with one of the feed rollers, a counter roller geared to the other feed-roller, means for adjusting the counter rollers, a roller on the shaft, means for moving the roller axially of the shaft, a weight controlled conical pulley for frictionally engaging the roller, means to move the pulley out of engagement with the roller, radially mounted disk electrodes adapted to engage the tube to be welded, means for adjusting the electrodes, a disc for engaging the edges of the tube, guide rolls cooperating with the disc, means for adjusting the guide-rolls and disc, and a reciprocating hammer arranged to operate on the edges of the tube in close proximity to the electrodes.

In testimony that I claim the foregoing as my invention I have signed my name.

FRANCESCO BRERO.